United States Patent [19]

Parker

[11] Patent Number: 4,906,983
[45] Date of Patent: Mar. 6, 1990

[54] DISPLAY DATA MEMORY

[75] Inventor: Martin Parker, Warton-Preston, United Kingdom

[73] Assignee: British Aerospace Public Limited Company, London, United Kingdom

[21] Appl. No.: 133,251

[22] Filed: Dec. 9, 1987

Related U.S. Application Data

[63] Continuation of Ser. No. 896,952, Aug. 15, 1986, abandoned.

[30] Foreign Application Priority Data

Aug. 16, 1985 [GB] United Kingdom ................. 8520545

[51] Int. Cl.$^4$ ............................................. G09G 1/14
[52] U.S. Cl. .................................... 340/747; 340/728; 340/750
[58] Field of Search .................... 340/825.79, 747, 728, 340/750, 799, 825.83, 825.88, 718, 719, 800, 801; 364/518, 521

[56] References Cited

U.S. PATENT DOCUMENTS

| | | | |
|---|---|---|---|
| 3,473,160 | 10/1969 | Wahlstrom | 340/750 |
| 4,189,743 | 2/1980 | Schure et al. | 340/799 |
| 4,368,463 | 1/1983 | Quilliam | 340/744 |
| 4,481,594 | 11/1984 | Staggs et al. | 364/521 |
| 4,513,281 | 4/1985 | Ngo | 340/703 |
| 4,658,247 | 4/1987 | Gharachorloo | 340/750 |

OTHER PUBLICATIONS

Foley, James D. and Van Dam, Andries: "Fundamentals of Interactive Computer Graphics", 1982, Addison-Wesley Publishing Company, Inc., pp. 446–451, 456, 641, 645, 648.

Primary Examiner—Donald J. Yusko
Assistant Examiner—Edwin C. Holloway, III
Attorney, Agent, or Firm—Cushman, Darby & Cushman

[57] ABSTRACT

The device includes a plurality of pixel control digit storage elements (1) each for association with a particular pixel of the display and functionally organized in the form of a two-dimensional array corresponding to the array of pixels of the display, interconnected with one another and with data and control signal input means (2, 3, 4) such that a pixel control digit, representing a given color or intensity say, entered into one "seed" element (i,j) automatically propagates through the device from one to another element until it reaches elements to which boundary indicative control signals are applied by way of said input means when propagation ceases. The boundary indicative control signals and the "seed" element may be derived from and chosen by an associated computer processor operating according to a conventional shape designing algorithm.

11 Claims, 2 Drawing Sheets

DISPLAY DATA MEMORY

This is a continuation of application Ser. No. 896,952, filed Aug. 15, 1986, which was abandoned upon the filing hereof.

BACKGROUND OF THE INVENTION

This invention relates to a graphic display memory device.

A graphic display may be generated by a t.v. monitor or like raster-scan apparatus while modulating the scanner beam in accordance with the contents of a memory holding a series of digits, one for each pixel of the display. For a computer generated image, the digits are placed in the memory by a computer processor. Such computer generated images can be made up of one or more contiguous areas or 'polygons' throughout which the colour or brightness of the display remains the same. These polygons may be generated by the processor identifying those memory locations which correspond to pixels at the edges or boundaries of the polygon and then 'filling-in' the polygon by a seed-fill algorithm in which a pixel control digit appropriate to the required colour or brightness is entered into a location associated with a pixel within the polygon, then addressing each location associated with the adjacent pixels and putting the same digit into them, and so on until it reaches the boundary locations. As an alternative, a vector fill algorithm is used in which a series of lines are drawn extending from one to the opposite side of the polygon without pre-calculation of its shape—instead, the line lengths are successively incremented from data indicative of the slope of each edge.

Vector-fill and/or seed fill algorithms may be supplied as firmware with purchased CGI apparatus. In either case, since the processor of the apparatus has to fill in the shape on a progressive basis, ie addressing each pixel storage location in turn and entering a digit therein, the speed of filling is not as great as may be desired unless very expensive custom built display apparatus is used.

SUMMARY OF THE INVENTION

According to one aspect of the invention, there is provided a graphic display data memory device comprising a plurality of pixel control digit storage elements interconnected one with another and with data and control signal input means such that a pixel control digit entered into one element automatically propagates through the device from one to another element until it reaches elements to which boundary indicative control signals are applied by way of said input means and, from these elements, the digit is not propagated further.

According to another aspect of the invention, there is provided a graphic display data memory device comprising a plurality of pixel control digit storage elements which, at least functionally but not necessarily physically, are organised in the form of a two-dimensional array for being associated with respective pixels of the display, the device further comprising gating means by way of which each element is interconnected with elements adjacent to it in said array and control signal input means by way of which boundary indicative control signals can be applied to selected ones of the elements to delimit a chosen contiguous portion of the display area, the arrangement being such that a pixel control digit will be entered into any one of the elements associated with a pixel within said chosen contiguous portion and said control digit will automatically pass via said gating means to adjacent elements associated with pixels within said portion, and then to elements adjacent to said adjacent elements and so on until it has propagated to all the elements associated with pixels within said portion.

Advantageously, the device comprises a plurality of multi-bit latches functionally organised as a two-dimensional array, a plurality of 'or' gating circuits having outputs connected to the bit inputs of respective ones of the latches, and a plurality of control gating circuits connected to the latch control inputs of respective ones of the latches, the bit outputs of each latch being fanned-out to the 'or' gating circuits of each of the adjacent latches, and each control gating circuit being operable to receive a control signal via input means of the device and, in dependence upon the value of that control signal, to permit the latch to accept a digit from one of said adjacent latches and to cause said digit to be passed to the inputs of said adjacent latches.

BRIEF DESCRIPTION OF THE DRAWINGS

For a better understanding of the invention, reference will be made, by way of example, to the accompanying drawings, in which.

DESCRIPTION OF THE PREFERRED EMBODIMENT

Figure 1:
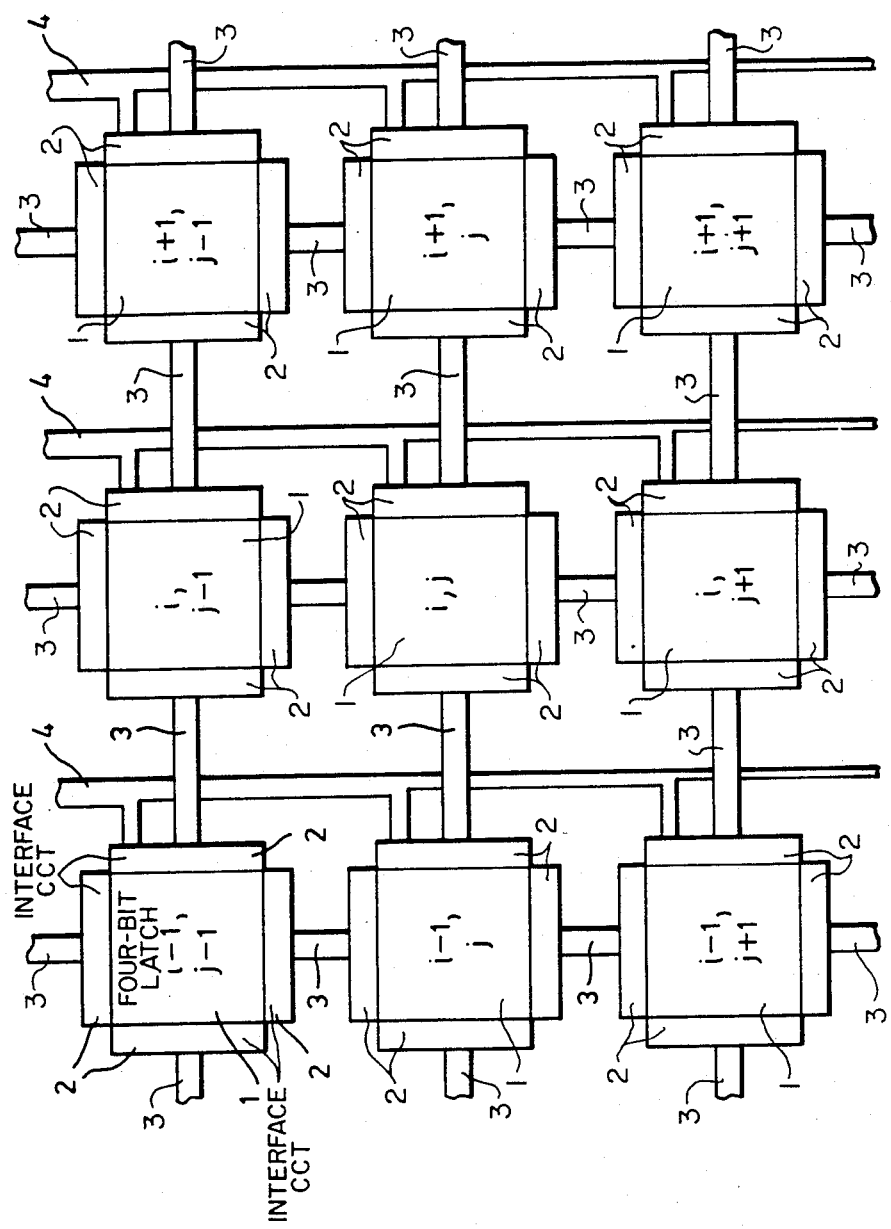
FIG. 1 is a diagrammatic view of part of a memory device.

The memory device shown in FIG. 1 comprises a matrix array of four-bit latches 1 each of which is interconnected via interface circuits 2 and data and control line buses 3 with the four latches adjacent to it in the array. Only one latch is labeled in FIG. 1 for clarity. Each latch is operable for holding a control digit for controlling one of the pixels of a raster-generated graphic display. To this end, the contents of the latches are available via data and control line buses 4 to a scanner (not shown) which scans the latches in synchronism with the generation of the raster in a way known to those skilled in the art. Buses 4 include, for each latch, four bit-output lines which are taken to the forementioned scanner, four bit input lines via which a control digit can be inserted in the latch, and two control lines one of which is used to designate the latch as a seed pixel latch and the other of which can be used to designate the latch as one which is to hold a pixel at the boundary of a particular portion of the display.

Figure 2:
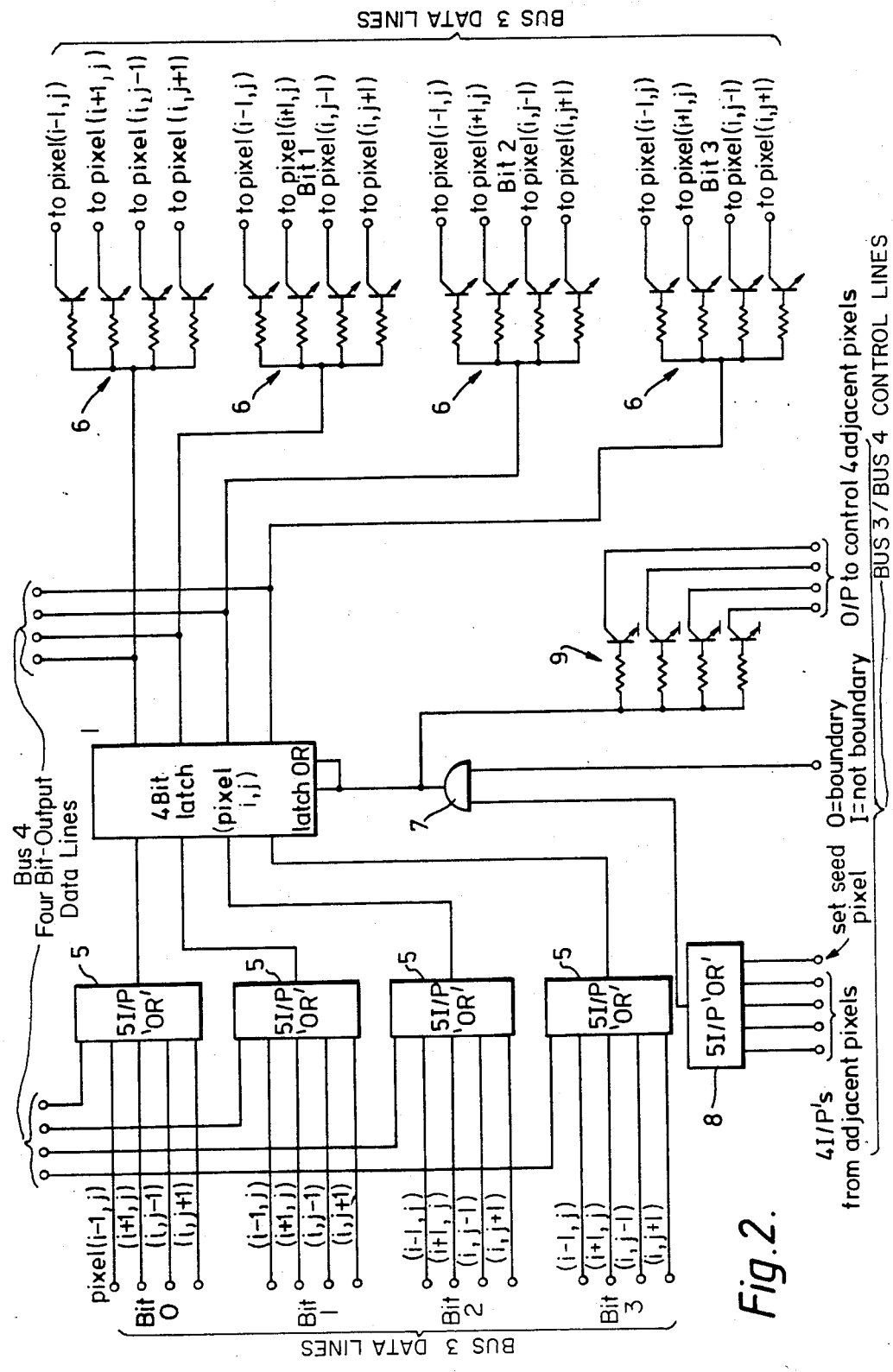
FIG. 2 is a simplified circuit diagram of a single storage element of the FIG. 1 device and its associated circuitry.

As shown in FIG. 2, each set of four bit-input lines in buses 4 are fed to appropriate inputs of the associated latch via respective ones of four five-input OR gates 5. The other inputs of each gate 5 receive the corresponding bit inputs of the four adjacent latches. Each set of four bit-output lines in buses 4 are connected to appropriate ones of the bit outputs of the associated latch. These outputs of the latch are also connected, via fan-out buffer amplifiers 6 to OR gates like the gates 5 but associated with respective ones of the four adjacent latches. The latch control and output enable terminals of each latch are connected to the output of an AND gate 7. One input of each gate 7 is connected to the boundary-set control line for the latch while the other input receives the output of a further five-input OR gate 8. One of the inputs of this gate is connected to the set seed pixel control line for the latch while the others are connected to the outputs of the AND gates for respective ones of the four adjacent latches via respective fan-out buffer circuits associated with the four adjacent latch circuits. These buffer circuits are of course each similar to the circuit 9, via which circuit, signals are applied from AND gate 7 to the equivalents of OR gate 8 for the adjacent latches.

Initially, those of the latches which are associated with pixels at the boundary of a contiguous portion of the display, which portion is to be 'filled-in' with the same colour, brightness and such, have their boundary-set control signals asserted so that AND gate 7 for each of these latches is closed. Meanwhile a control digit appropriate to the required pixel characteristics is applied to the inputs of one of the latches associated with a pixel within the portion to be filled-in and the set-seed pixel control line for this latch is asserted. The digit thus becomes entered into the latch and is thus applied via fan out amplifiers 6 and OR gates 5 to the adjacent latches. The output of gate 7 is also applied via buffers 9 to the OR gates 8 of the adjacent latches. Provided the AND gates 7 for these latches are open, the control digit is propagated into them. The propagation continues from each latch to the adjacent latches and so on until it reaches those where the boundary-set control signals are asserted and hence the AND gates 7 are closed. This de-asserts the latch control and output enable inputs of the latches so the seed digit is not entered into them and not propagated further.

The shape of the display portion to be filled in, and hence the latches at which the boundary-set control signals are to be asserted, and the seed point are calculated by an associated computer processor (not shown) as in an appropriate shape designing algorithm—thereafter, however, the seed filling of the portion is automatic and does not have to be carried out by the processor itself.

Each latch could have a number of bits other than four, for example it could have eight—the inter-connections between the latches would then retain the same format but of course there would be more of them.

In either case, depending upon the number of display pixels, the number of connections may be quite large so clearly it is advantageous for the memory to be implemented as a single VLSI logic chip. The video scanner is preferably also implemented on the same chip.

I claim:

1. A graphic display data memory device for controlling a plurality of pixels of an image, comprising:
a plurality of interconnected modules, each for controlling a pixel, each comprising:
(a) interface means connected to receive input from all adjacent ones of said modules and to provide output to all adjacent ones of said modules, and having a first terminal adapted to receive a control digit thereon and a second terminal adapted to receive a boundary indicative signal thereon; and
(b) latch means, connected to said interface means, for receiving said control digit either:
(a1) from said first terminal, or
(a2) as part of said input from any of said adjacent modules via said interface means, and responsive to said boundary indicative signal, for, when said boundary indicative signal indicates no boundary:
(b1) producing a signal to control said pixel, and
(b2) producing an output signal of said control digit and passing said output signal to said interface means to be passed to said all adjacent modules, so that said control digit passes to said all adjacent modules when said module is not a boundary module,
and when said boundary indicative signal indicates a boundary, not producing said output signal to thereby prevent said control digit from spreading beyond a boundary defined by modules which are supplied with said boundary signal.

2. A device as in claim 1 wherein each said module is interconnected to four other of said modules to form a two-dimensional array.

3. A device as in claim 1 wherein said control digit comprises a plurality, n of bits, and wherein said interface means comprises said plurality n of multiple input 'OR' gates, inputs to one input to each said 'OR' gate being connected, respectively, to each said adjacent module to receive said output signal indicative of said control digit therefrom.

4. A device as in claim 3 wherein another input to said multiple input 'OR' gates is said input from said first terminal adapted to receive said control digit thereon.

5. A device as in claim 4 wherein said interface means further comprises a plurality of fan-out amplifiers for providing said output signal to said adjacent modules.

6. A device as in claim 5 wherein said latch means is a multi-digit latch, and said boundary indicative signal selectively enables said latch.

7. A graphic display data memory device comprising:
a plurality of interconnected modules, each controlling a pixel (i, j), and each said interconnected module for pixel (i,j) comprising:
(a) interface means, connected to receive input from all adjacent modules which includes a control digit, said adjacent modules including module (i−1, j), module (i+1, j), module (i, j−1) and module (i, j+1) and to provide output to all of said adjacent modules, said interface means further comprising a first terminal adapted to receive said control digit thereon, and a second terminal for receiving a boundary indicative signal thereon, said boundary indicative signal having a boundary state which indicates that said module (i, j) is a boundary module, and a non-boundary state indicating that said module (i, j) is not a boundary module;
(b) a plurality of means for selecting an active control digit, among any of said inputs from said adjacent modules; and
(c) latch gating means, receiving input from said control digit selecting means and from said interface means, for receiving said control digit from either of said first terminal or from said control digit selecting means, and responsive to said boundary indicative signal for:
(a) producing a signal to control said pixel (i, j) when said boundary indicative signal is in said non-boundary state;
(b) producing an output signal indicative of said control digit and passing said output signal to said interface means when said boundary indicative signal is in said non-boundary state, thereby passing said output signal to all of said adjacent modules (i−1, j); (i+1, j); (i, j−1); and (i, j+1); and (c) when said boundary indicative signal indicates a boundary state, not passing said digit to said output.

8. A device as in claim 7 wherein said control digit selecting means is a multiple input 'OR' gate.

9. A device as in claim 8 wherein said first terminal is also connected to one input of said multiple input 'OR' gate.

10. A device as in claim 9 wherein said interface means comprises a plurality of fan-out amplifiers for amplifying said signal to provide said signal to all of said adjacent modules.

11. A method of controlling the values of a two-dimensional array of connected pixels defining an image area comprising the steps of:

labelling a plurality of pixels in the array and bordering a selected region of the image area with boundary indicative signals;

applying a pixel value control signal to one of the pixels within the region;

subsequently propagating said pixel value control signal to all pixels connected to said one of the pixels and all pixels connected to those and so on to propagate the pixel value control signal to all pixels within the image area except those pixels labelled with boundary indicative signals and beyond;

continuing said propagating until all pixels labelled with boundary indicative signals have been reached; and setting all pixels to which the pixel value control signal has been propagated and applied to a predetermined regional value, to fill the whole of said selected region of the image area with pixels having said predetermined regional value.

* * * * *